United States Patent [19]

Kraus

[11] Patent Number: 4,496,529
[45] Date of Patent: Jan. 29, 1985

[54] PREPARATION OF METAL CYANATES FROM ALKYL CARBAMATES

[75] Inventor: Theodore C. Kraus, Cheshire, Conn.

[73] Assignee: Olin Corporation, Cheshire, Conn.

[21] Appl. No.: 622,365

[22] Filed: Jun. 20, 1984

[51] Int. Cl.³ .............................................. C01C 3/14
[52] U.S. Cl. ................... 423/365; 423/648 R; 568/876
[58] Field of Search ............... 568/876, 884; 423/365, 423/648 R

[56] References Cited

U.S. PATENT DOCUMENTS

| | | | |
|---|---|---|---|
| 868,252 | 10/1907 | Bouveault et al. | 568/884 |
| 1,915,425 | 6/1933 | Kloepfer. | |
| 2,563,044 | 8/1951 | Kamlet | 568/876 |
| 2,665,968 | 1/1954 | Bucci. | |
| 2,690,956 | 10/1954 | ter Horst. | |
| 2,690,957 | 10/1954 | ter Horst. | |
| 2,729,541 | 1/1956 | De Pree et al. | |
| 2,801,154 | 7/1957 | De Pree et al. | |
| 3,280,199 | 10/1966 | Schmerling | 568/884 |
| 3,321,270 | 5/1967 | Davis et al. | |
| 3,935,300 | 1/1976 | Tucker et al. | |
| 3,950,497 | 4/1976 | Verstegen | 423/365 |
| 4,000,249 | 12/1976 | Sochol et al. | |
| 4,255,453 | 3/1981 | Jordan | 423/365 |

FOREIGN PATENT DOCUMENTS

| | | | |
|---|---|---|---|
| 339220 | 12/1930 | United Kingdom | 423/365 |
| 783661 | 9/1957 | United Kingdom | 568/884 |
| 967952 | 10/1982 | U.S.S.R. | 423/365 |

*Primary Examiner*—John Doll
*Assistant Examiner*—Wayne A. Langel
*Attorney, Agent, or Firm*—William D. Sabo

[57] ABSTRACT

Disclosed is a process for preparing metal cyanates by reacting an alkyl carbamate having the formula

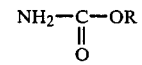

wherein R is a lower alkyl group having 1 to 4 carbon atoms with an alkali metal hydride or an alkaline earth metal hydride.

5 Claims, No Drawings

PREPARATION OF METAL CYANATES FROM ALKYL CARBAMATES

BACKGROUND OF THE INVENTION

1. Field of the Invention

This invention relates to a process for preparing metal cyanates, and, more particularly, to the preparation of metal cyanates from alkyl carbamates.

2. Description of the Prior Art

It is known in the art to form metal cyanates from urea. For example U.S. Pat. No. 1,915,425 discloses the production of alkali metal cyanates by reacting urea with an alkali metal carbonate. See also U.S. Pat. No. 2,690,957, in which the reaction between urea and an alkali metal carbonate is carried out by employing select reaction conditions.

Another procedure for producing alkali metal cyanates involves the reaction of urea with an alkali metal oxide. See U.S. Pat. No. 2,801,154. In U.S. Pat. No. 2,729,541, urea is reacted with a dispersion of an alkali metal to form alkali metal cyanates. In accordance with another known technique, alkali metal cyanates are made by reacting urea with an alkali metal hydroxide in a fluidized bed reactor. See U.S. Pat. No. 3,321,270.

Other patents which show the state of the art include U.S. Pat. Nos. 2,665,968; 2,690,956; 3,935,300; and 4,000,249.

It has been found, however, that none of the prior art processes generally produces high purity metal cyanates in yields greater than about 90–95 percent.

SUMMARY OF THE INVENTION

In accordance with the present invention, there is provided an improved process for preparing metal cyanates. Specifically, the process involves reacting an alkyl carbamate having the formula

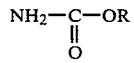

wherein R is a lower alkyl group having 1 to 4 carbon atoms with an alkali metal hydride of an alkaline earth metal hydride. In the practice of the invention, high purity metal cyanates are produced in yields generally in excess of about 95 percent. In addition, in carrying out the process, by-products are obtained which can be conveniently recycled for use in the formation of suitable starting materials, as will be apparent from the description which follows.

DETAILED DESCRIPTION

According to the process of the present invention, metal cyanates are prepared by reacting an alkyl carbamate with an alkali metal hydride or an alkaline earth metal hydride. The general reaction is illustrated below in equation (A). In equation (A), ethyl carbamate is reacted with sodium hydride to form sodium cyanate.

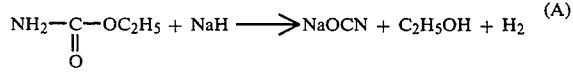

The alkyl carbamate reactant has the formula

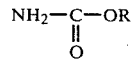

wherein R is a lower alkyl group having 1 to 4 carbon atoms. The alkyl carbamate reactant may be made by any suitable method known in the art. See, for example, Morrison, R. T. and Boyd, R. N., *Organic Chemistry* (3rd Edition) pages 685 and 1044 (1973). Various alkyl carbamates such as ethyl carbamate are commercially available.

Any suitable alkali metal hydride or alkaline earth metal hydride may be employed in carrying out the process of the invention. Illustrative alkali metal hydrides include sodium hydride, potassium hydride and lithium hydride. Illustrative alkaline earth metal hydrides include calcium hydride, magnesium hydride and beryllium hydride.

Preferably, the reaction is performed with at least an equimolar amount of the alkyl carbamate to the metal hydride. However, a molar excess of either reactant may be suitably employed.

Preferably, the reaction between the alkyl carbamate and the metal hydride is carried out in the presence of an inert solvent. Any suitable inert solvent, such as benzene, the chlorobenzenes, the trichlorobenzenes, toluene, the chlorotoluenes, xylene, diethyl ether, dimethylformamide, carbon tetrachloride, chloroform, etc., may be employed.

The actual reaction conditions such as temperature and time may vary over wide ranges. Generally, a reaction temperature from about 30° C. to about 150° C. and preferably from about 70° C. to about 120° C., is employed. The reaction time may vary considerably depending generally on the temperature.

The metal cyanates may be recovered from the reaction mixture by any conventional means, for example, filtration, extraction, recrystallization or the like.

The metal cyanate products can be used in a wide variety of applications, e.g. in the preparation of organic isocyanates and isocyanurates, as will be readily apparent to those skilled in the art. In accordance with the process of the invention, a high purity final product is obtained, which is substantially purer than metal cyanates presently available commercially. These metal cyanates are thus particularly suitable for pharmaceutical applications where high grade products are required.

The following examples are provided to further illustrate the invention. All parts and percentages are by weight unless otherwise specified.

EXAMPLE 1

A 500 ml round bottom flask fitted with condenser, nitrogen inlet, drying tube, and magnetic stirrer was charged with 9.5 g (107 millimoles) of ethyl carbamate and 200 ml of dry toluene. Over a period of one hour 2.45 g (100 millimoles) of sodium hydride (99%) was added in small portions to the toluene solution and the mixture was gradually heated to reflux. When addition of the sodium hydride was completed, the refluxing was continued for an additional hour. The white cyanate product was filtered, washed several times with ether and then air dried. No additional purification was necessary. The dried product weighed 6.4 g representing a 98.5% yield of essentially pure product.

EXAMPLE 2

The procedure of Example 1 was repeated, except that lithium hydride was employed in place of sodium hydride. Under identical conditions high purity lithium cyanate was produced in 97% yield.

What is claimed is:

1. A process for preparing metal cyanates comprising reacting an alkyl carbamate having the formula

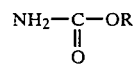

wherein R is a lower alkyl group having 1 to 4 carbon atoms with an alkali metal hydride or an alkaline earth metal hydride.

2. The process of claim 1, wherein said alkyl carbamate is reacted with an alkali metal hydride.

3. The process of claim 2, wherein said alkyl carbamate is ethyl carbamate.

4. The process of claim 3, wherein said alkali metal hydride is sodium hydride.

5. The process of claim 3, wherein said alkali metal hydride is lithium hydride.